Aug. 12, 1924.
D. TURNER
1,504,796
CLOTH MEASURING AND COST COMPUTING MACHINE
Original Filed Jan. 26, 1920   3 Sheets-Sheet 2
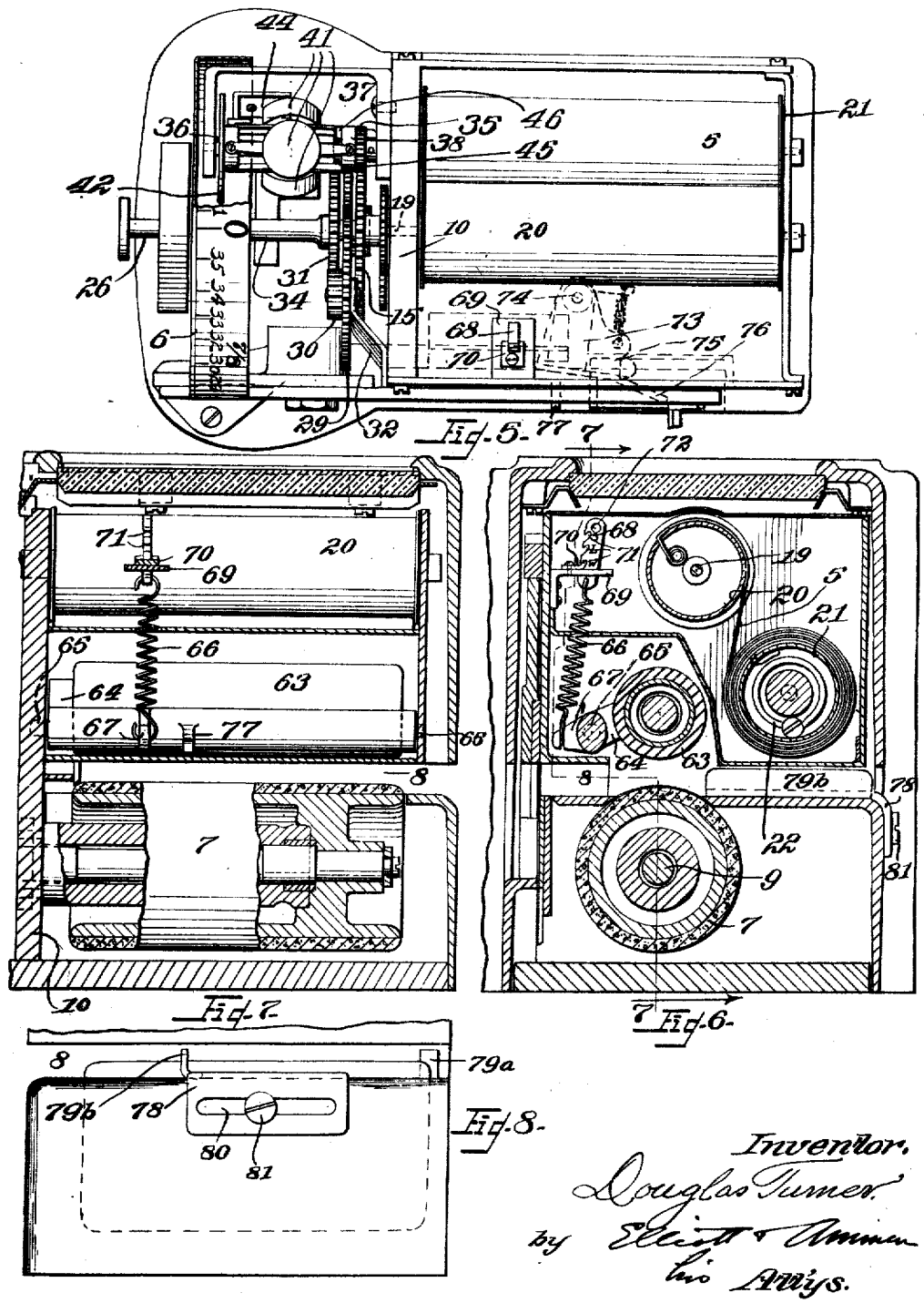
Inventor.
Douglas Turner
by Elliott & Ammen
his Attys.

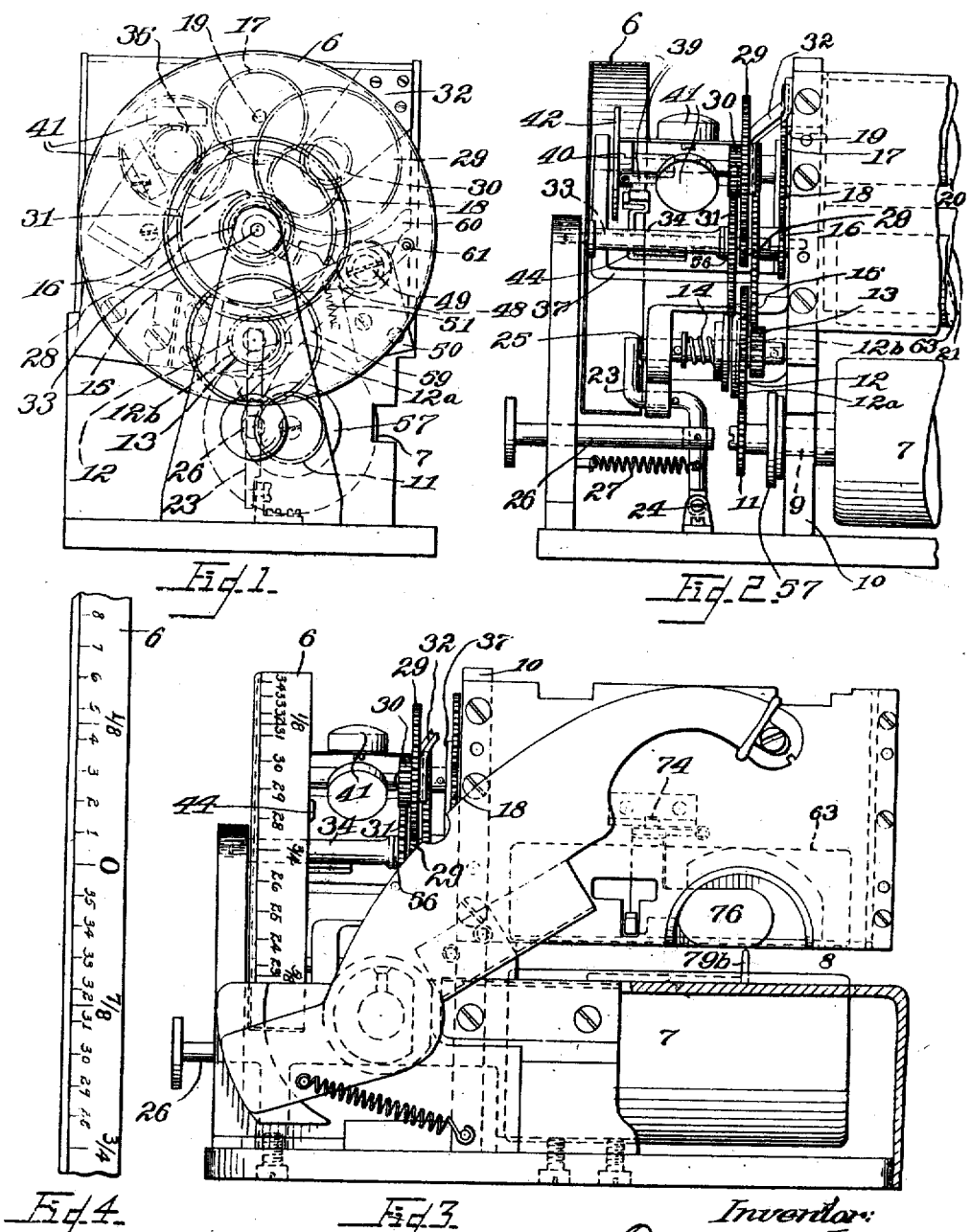

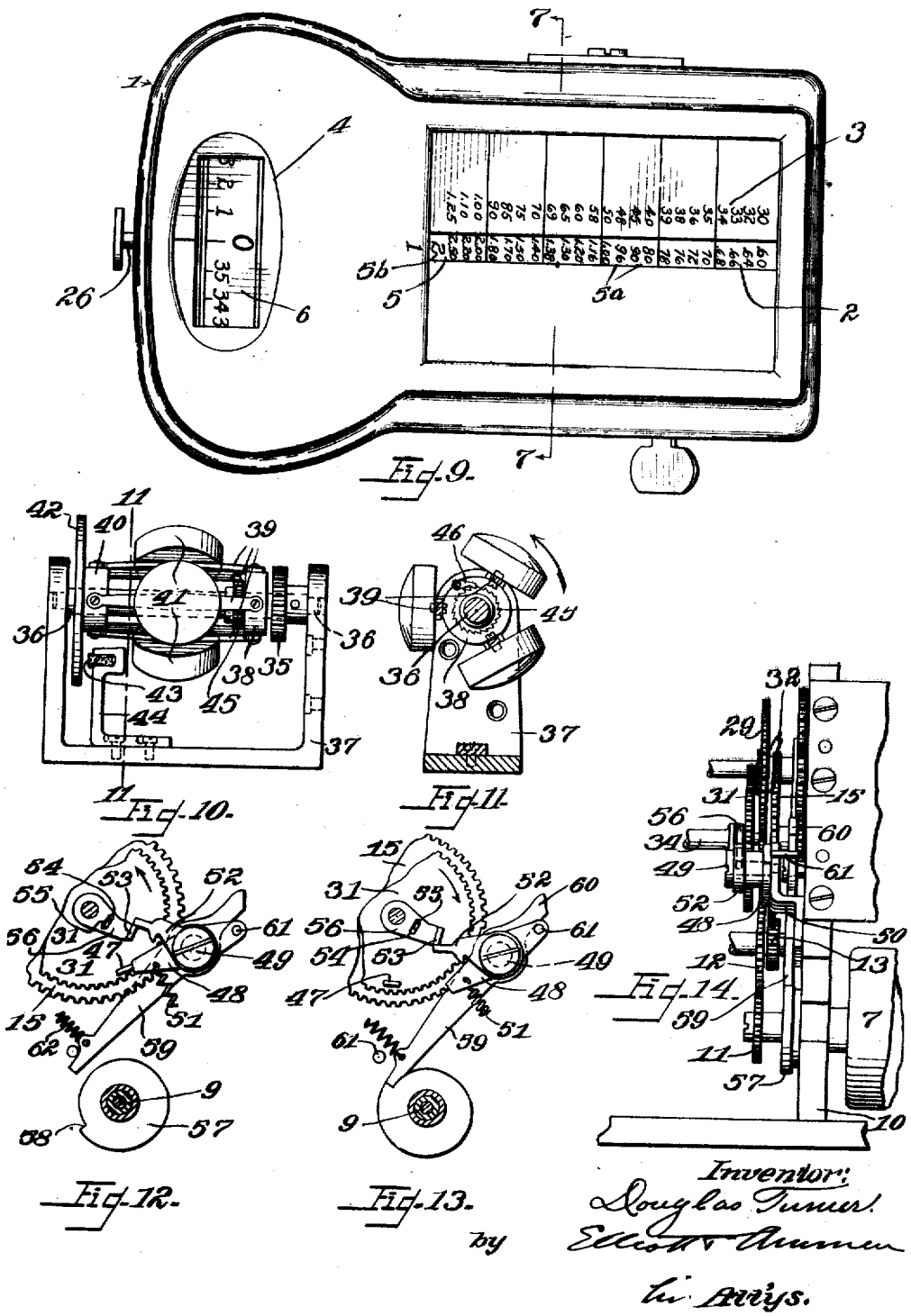

Patented Aug. 12, 1924.

1,504,790

UNITED STATES PATENT OFFICE.

DOUGLAS TURNER, OF ST. LOUIS, MISSOURI, ASSIGNOR TO THE MEASUREGRAPH COMPANY, OF ST. LOUIS, MISSOURI, A CORPORATION OF MISSOURI.

CLOTH-MEASURING AND COST-COMPUTING MACHINE.

Application filed January 26, 1920, Serial No. 354,043. Renewed March 29, 1922. Serial No. 547,908.

*To all whom it may concern:*

Be it known that I, DOUGLAS TURNER, a citizen of the United States, residing in the city of St. Louis and State of Missouri, have invented new and useful Improvements in Cloth-Measuring and Cost-Computing Machines, of which the following is a specification.

This invention relates to cloth-measuring and computing machines. The general object of the invention is to produce a simple and compact measuring machine. In accomplishing this I have simplified the construction of the reduction gearing of the indicating mechanism, so as to enable the number of parts of the mechanism to be reduced. It is usual to provide such machines with means for returning the indicating mechanism to zero and for stopping it at the zero position; one of the objects of my invention is to provide simple means for effecting this stopping of the indicating mechanism at the limit of the measuring capacity of the machine, and at the zero position in the returning movement, operating without subjecting the mechanism to a substantial shock; also to provide simple means for preventing racing of the mechanism when the same is returning to zero. Another object is to provide simple means for adapting the machine to measure different materials, which incidentally increases the accuracy of the measurement indicated by the indicating mechanism, and to provide simple means for guiding materials of different widths in passing through the machine.

Further objects of the invention will appear hereinafter.

The invention consists in the general combination of parts and in the novel features hereinafter described, all of which contribute to produce an efficient cloth-measuring and computing machine.

The preferred embodiment of my invention will be particularly described in the following specification, while the broad scope of my invention will be pointed out in the appended claims.

In the drawings;

Figure 1 is an end elevation of the machine removed from its case;

Figure 2 is a vertical section taken through the indicating wheel, the remainder of the mechanism being shown generally in side elevation, and partly broken away;

Figure 3 is a side elevation, certain parts being shown in cross-section;

Figure 4 is a developed plan of the face of the indicating wheel;

Figure 5 is a plan of the complete machine with the casing removed, and with a portion of the indicating wheel broken away and shown in cross-section;

Figure 6 is a cross-section through the machine, particularly illustrating the mechanism for adapting the machine to measure different kinds of piece-goods;

Figure 7 is a longitudinal section taken about on the line 7—7 of Figure 6; but parts are broken away;

Figure 8 is a side elevation of the lower portion of the machine, illustrating means for adapting the machine to measure piece-goods of different widths;

Figure 9 is a plan of the complete machine;

Figure 10 is a detail side elevation upon an enlarged scale illustrating a governor which constitutes a feature of the invention;

Figure 11 is a cross-section through the governor taken on the line 11—11 of Figure 10;

Figure 12 is a detail, certain parts being broken away illustrating the means for stopping the indicating mechanism at the zero position in the returning movement;

Figure 13 is a view similar to Figure 12, but illustrating the operation of this mechanism in stopping the machine at the limit of the measuring capacity of the machine; and Figure 14 is a detailed side elevation, certain parts being broken away and further illustrating the parts illustrated in Figures 12 and 13.

Before proceeding to a detailed description of the machine, it should be stated that in the preferred construction, the machine includes an indicating drum or chart, which carries computed numbers corresponding to different measurements, and these numbers co-operate with a fixed scale so as to indicate the cost or charge to be made for any amount of cloth or piece-goods measured. This chart also carries yard indicating numbers that indicate the number of full yards that the machine has measured. Usually the number of yards and fractions thereof actually measured, is indicated by means of two hands rotating on a dial. The use of two hands or pointers on a dial, rotating as they do at different speeds, necessitates the use of considerable reduction gearing. According to my invention I indicate the total number of yards on the chart and I provide a continuously rotating number-wheel which indicates parts of a yard measured, and this wheel makes one complete revolution for each yard. This makes it possible for me to drive the number-wheel by the train of gears usually employed to drive the inch indicating hand or pointer of the dial. In this way I dispense with the usual reduction gearing necessary to drive the yard hand or pointer employed on the usual dial. This simplifies the construction of the machine very much and reduces the number of parts.

In machines of this type, it has been customary to stop the operation of the machine at the limit of the measuring capacity of the indicating mechanism, for example, in a machine having a measuring capacity of 12 yards, the measuring roller is positively arrested when the indicating mechanism arrives at a point indicating a measurement of 12 yards. The mechanism may also be returned by a spring to its zero position. In machines of this type a single mechanism is usually provided which performs the function of stopping the machine at the limit of its measuring movement, and which also stops the indicating mechanism at the zero position when being returned to zero after a measuring operation. In order to accomplish this purpose, a controller wheel has been employed which makes one complete revolution while the indicating mechanism is moving from zero to 12 yards, or to any other amount which corresponds to the measuring capacity of the machine. According to my invention, I provide means co-operating with this controller wheel for effecting the operation of stopping the mechanism, and operating in such a way as to facilitate the adaptation of the machine to special requirements and to give a desirable flexibility as regards the point of stopping the mechanism. For example, by means of my improvement I can stop the indicating mechanism if desired, a little beyond the limit point of the measuring capacity. This would be accomplished by making a very slight change in one of the parts of the mechanism.

A governor is provided, preferably in the form of a centrifugal mechanism which operates in such a way in returning to zero, as to prevent the mechanism from racing. This governor mechanism which I have used for this purpose involves the use of governor weights which are driven by the indicating mechanism, so that they rotate about an axis, and if the speed should become very great, an automatic brake is applied tending to reduce the speed. The novelty of my invention, as regards the governor, resides in the provision of means for disconnecting the drive to the governor when the indicating mechanism is stopped, that is to say, the connection to the governor is broken when the indicating mechanism is stopped at the zero position in the return movement; the advantage of this is that the momentum of the governor weights does not have to be absorbed by the mechanism, but simply results in the governor spinning itself along idly and without exerting any effect upon the indicating mechanism.

The piece-goods being measured, in passing through the machine, runs between the measuring roller and a presser roller, the function of the presser roller being to press or force the material against the face of the measuring roller. The degree of this pressure to attain an accurate measurement depends entirely upon the kind and quality of the goods being measured. According to my invention, I provide a regulating device which is so constructed that it can be set in different indicated positions corresponding to the different degrees of pressure required in the presser roller.

Referring more particularly to the parts, 1 represents the casing of the machine (see Fig. 9) which is provided on its inner side with a large sight opening 2 adjacent to which there is provided a fixed price scale 3 which bears numbers indicating different prices per yard; the upper side of the casing is also provided with a sight opening 4. In the sight opening 2 and co-operating with the scale 3 there is provided a chart 5 carrying numbers 5ª which are found by computation and which will indicate the charge to be made for different lengths of goods, for example, the number 60 on the chart is opposite the number 30 on the scale, indicating that the price of two yards is 60 cents, etc. This chart also carries yard-numbers, such as the number 5ᵇ, that indicate the number of full yards that have been measured.

In the sight opening 4, a number wheel 6 is provided which carries numbers indicating parts of a yard, that is to say, numbers indicating inches, and others indicating yard fractions, such as ⅛ of a yard, ¼ of a yard, etc.

Within the casing, and in the lower portion thereof, there is provided a measuring roller 7 (see Fig. 2) and this measuring roller is rotated by the material when it is pulled through the gap 8 (see Fig. 3) which is formed in the casing.

Suitable driving mechanism is provided for driving the chart and the wheel 6 from the measuring roller. Any suitable arrangement of gearing may be employed for this purpose, which will provide the proper reduction in angular rotation. For this purpose the shaft 9 of the measuring roller is extended through a vertical frame plate 10 of the machine, and carries a pinion 11. (See Fig. 2.) Through a suitable clutch 12 this pinion drives the indicating mechanism. A gear wheel 12ª constitutes one of the clutch members and this gear wheel constantly meshes with, and is driven by the pinion 11; the other clutch-member 12ᵇ is in the form of a pinion 13; the clutch is normally held closed by a coil spring 14. When the clutch is in its closed condition the pinion 13 will be rotated by the gear 12ª and will impart its movement to large gear wheel 15 and this gear wheel is rigid with a pinion 16 which meshes with idler 18 meshing with a gear wheel 17 carried on the shaft 19 of a take-up roller 20. (See Fig. 6.) This roller or drum may carry a chart directly attached to it, but I prefer to employ the chart 5 in the form of a web which is normally wrapped about a drum 21.

When the instrument is being used, the chart wraps off the drum 21 onto a take-up roller 20 and is constantly maintained in tension by a spring 22 within the drum 21. This spring 22 also operates to return the drum and the rest of the indicating mechanism to zero when the clutch 12 is opened.

Any suitable means may be provided for opening this clutch, for example, it may be opened by means of an S shaped arm 23 pivoted at 24 (see Fig. 2), the end of the arm resting against a stem or clutch shaft 25 which carries the movable clutch-member 12ᵇ. This S shaped arm may be operated at will by means of a stem 26 having a head on the exterior of the machine for operating it, the stem being returned by a suitable spring 27 after having been operated.

A suitable gear train is provided for driving the controller wheel, that controls the stopping of the indicating mechanism at the limit of the measuring capacity, and at zero in the returning movement: for this purpose, rigid with gear 15, I provide a pinion 28 which meshes with a gear wheel 29, said gear wheel carrying a rigid pinion 30 which meshes with a controller wheel 31 carried on a sleeve 34, loosely mounted on a spindle 33. This spindle carries the gear wheels 15 and 16. The gear wheels 29 and 30 are mounted to rotate in a suitable bracket 32 attached to the vertical frame-plate 10. The wheel 31 makes one complete revolution when the indicating mechanism is moving between zero and the greatest possible measurement of the machine, that is to say, the limit of the measuring capacity of the machine. The spindle 33 carries the number wheel 6, and is rotatably mounted in a bracket plate 10ª.

Special attention is called to the simplicity of the drive from the measuring roller 7 to the number wheel 6. This drive is from the pinion 11 through the gear wheel 12 and its associated pinion 13 to the gear wheel 15 which is rigidly carried on the spindle 33 that carries the number wheel 6. It must be remembered, however, that the movement of the gear wheel 12 will only be imparted to the pinion 13 when the clutch is closed.

I shall now describe the governor mechanism which is driven by the indicating mechanism when it is being returned to zero by the spring 22. Referring especially to Figures 1, 10 and 11, the gear wheel 15 meshes with a pinion 35 which is rigidly attached to a governor shaft 36 mounted in a suitable U-shaped bracket 37, one end of which is secured to the side of the frame-plate 10. The governor shaft 36 also carries a loose collar 38 to the sides of which a plurality of spring-arms 39 are attached; these arms extend longitudinally of the shaft and are attached at their outer ends to a sliding collar 40 that may slide to and fro, slightly, on the governor-shaft. These arms 39 carry governor-weights 41 which fly out under the action of centrifugal force if the machine tends to race in returning to zero. If the weights move out in this way the arms 39 will operate to pull the collar 40 inwardly on the shaft. This collar 40 carries a brake member in the form of a large disc 42 and when this disc moves with the collar 40, if the movement is sufficient, it will come against a fixed brake member which I provide and which is in the form of a shoe 43 carried in a suitable bracket 44. This will offer considerable resistance, and this will prevent the speed of the machine from going beyond a predetermined point.

I provide means for driving the governor weights 41 in such a way that the connection to the governor is released when the indicating mechanism is stopped at zero; this is preferably accomplished by providing a one-way drive-connection (see Fig. 11) between the indicating mechanism and the governor. This drive-connection includes a ratchet 45 rigid on the governor shaft 36, the teeth of which are inclined in one direction, and co-operate with a pawl 46 attached to the inner face of the aforesaid collar 38. Now, assuming that the direction of rotation of the governor shaft 36, in returning to zero, is the same as that indicated by the arrow in Figure 11, it will be evident that the ratchet wheel 45 will rotate the governor; it will also be evident that if the indicating mechanism is suddenly stopped, the governor will not be stopped but will continue to rotate idly, the pawl 46 simply "ratcheting" over the teeth of the ratchet wheel 45 without having any effect on the mechanism. This feature of my invention avoids the necessity for absorbing the momentum of the governor weights when the indicating mechanism is stopped at the zero position.

I shall now describe the mechanism which I prefer to employ for stopping the indicating mechanism at the limit of the measuring capacity of the machine, and also at the zero position, when the indicating mechanism is returned to zero.

Referring especially to Figures 12 to 14, the controller wheel 31 is provided on its outer face with a projection or stop 47, and I provide a small dog 48 mounted to rotate on a pivot pin 49 carried in a suitable bracket 50, (see Fig. 1); this dog is normally held out of the path of the stop 47, but when the indicating mechanism returns to the zero position, it is rocked automatically into the path of the stop so that the stop will strike against the end of the dog. (See Fig. 12.) This will stop the indicating mechanism at the zero position. This dog is normally held away from the path of the stop 47 by means of a small spring 51. (See Fig. 12.) In order to throw the dog 48 into the path of the stop 47, I provide a trigger 52 which is loosely attached to the pivot bolt 49. The end of the trigger projects across the face of the controller wheel and is in a position to be struck by a dog or toe 53 which is connected to the controller wheel through a lost-motion device; this lost-motion device is preferably in the form of a pin-and-slot connection, that is to say, a pin 54 carried on the controller wheel and lying in a slot 55 formed in an arm 56, the end of the arm being turned up to form the toe or dog 53. It should be understood that the trigger or finger 52 and the dog 48 are rigid with each other; from this arrangement, when the indicating mechanism is returning to zero, that is to say, when the parts are moving in the direction indicated by the arrow in Figure 12, just before the indicating mechanism reaches the zero position, the toe 53 will strike the underside of the trigger 52 and move it upwardly, that is, it will give the trigger a rocking movement in a clockwise direction. This movement will throw the end of the dog 48 into the path of the stop 47 and this will stop the indicating mechanism in the zero position. In order to stop the indicating mechanism at the limit of the measuring movement, the shaft 9 of the measuring roller carries a locking disc 57, the edge of which is provided with a notch or shoulder 58; on the pivot pin 49 a locking lever 59 is loosely mounted and this lever has a tail or upper arm 60 which extends up beyond the pivot pin 49 so that its edge lies adjacent to the side of a small pin 61 carried by the trigger 52. Now, when the indicating mechanism is reaching the limit of the measuring movement, the toe engages the upper side of the trigger 52 (see Fig. 13) and gives the trigger a rotation or rocking movement in an anti-clockwise direction; this movement operates through a pin 61 on trigger 52 to swing the locking lever 59 inwardly into the path of the shoulder 58. This stops the rotation of the measuring roller and the indicating mechanism. The locking lever 59 is normally held out of the path of the shoulder 58 by means of a small spring 62. (See Fig. 12.)

The purpose of the lost-motion device is to give a certain flexibility and reduce shock when stopping the indicating mechanism. It also gives a readily variable member, consisting of the arm 56, the slot 55 of which can be made as long or as short as desired and positioned where desired on the arm. Furthermore, the toe 53, on the end of the arm can be made any width desired, thereby regulating the time of operation of the stopping mechanism. In this way, the arm operates as a piece which is very easily altered or corrected to produce accurate operation of the machine, and by changing the length of the slot or the width of the toe 53 the mechanism can be readily adapted to stop the mechanism if desired, a little beyond the indicated capacity of the machine.

Heretofore, a fixed pin on the controller wheel has been employed to operate the trigger, but that arrangement leaves no flexibility whatever, and is not so advantageous for many reasons, as the construction described.

I shall now describe the means which I provide for regulating the pressure of the goods against the face of the measuring roller.

Referring especially to Figures 6 and 7, I provide a presser roller 63 which is carried on a frame 64, the said rocking frame having pivots or trunnions 65 mounted to rock in the frame of the machine. This roller is normally pulled down against the face of the measuring roller by a coil spring 66, the lower end of which is attached to an arm 67 projecting from the rock frame 64. Associated with the spring 66, I provide an adjusting device having a plurality of indicated adjusting positions for regulating the tension of the spring to correspond to different classes of goods to be measured. For this purpose, I provide a plate 68 which is attached to the upper end of the spring, and this plate lies in a slot in a bracket 69; on this bracket there is attached a small plate 70 having an upturned edge. The edge of the plate 68 has a plurality of inclined notches 71 in it, any one of which may engage the upturned end of the plate 70. The plate adjacent to these notches is marked to indicate the character of the goods which should be measured when that notch is cooperating with the plate 70, that is to say, the lowest notch is marked "W", indicating that this is the position which adapts the machine for measuring wool, the intermediate notch is marked "L" which indicates that that notch should be used when linen or similar material is to be measured; the upper notch is marked "S" to indicate that this is to be used when measuring silk or similar material. The upper end of the plate 68 is provided with a small hole 72 to which a hook may be applied for effecting the above described adjustment of the plate 68. It should be understood that in Figure 6 the presser roller 63 is represented as locked in an elevated position; this is accomplished by mechanism which forms no part of my invention and the construction of which is of no importance. This mechanism, however, is indicated in Figure 5, and simply comprises a small locking lever 73 which is pivoted at 74 on a bracket 75. The locking lever 73 has a thumb plate 76, and when this thumb plate is pressed inwardly it withdraws the locking lever from engagement with a short arm 77 carried by the rocking frame. (See Fig. 7.) In other words, when the thumb plate 76 is pressed inwardly, the locking lever 73 will release the arm 77 and permits the spring 66 to pull the presser roller down against the face of the measuring roller.

I also provide means for guiding material of different widths through the gap 8 of the machine. For this purpose, the casing is provided near the inner end of the gap, with a fixed guide or stop 79ª, and on the lower side of the gap 8 there is provided a small plate in the form of a saddle 78. This plate has an upturned edge operating as an adjustable guide or stop 79ᵇ, and may be provided with a longitudinal slot 80 through which passes a clamping screw 81; the plate 78 may be adjusted so as to place the stops 79ª and 79ᵇ at a predetermined distance apart. In this way the machine can be adapted for measuring narrow goods, such as ribbons and similar piece-goods.

I prefer to employ a number-wheel of cup form which is light in weight and at the same time makes for compactness in construction, because I mount this wheel with its disc lying adjacent the bracket plate 10ª; as the rim of the wheel then projects toward the frame plate 10, a chamber is formed within the wheel that will permit parts of the mechanism to project into the interior of the number-wheel, for example, the outer part of the govenor mechanism. This is facilitated by reason of the fact that I mount the number-wheel to rotate in a vertical plane while the shafts of the mechanism are generally disposed in a horizontal plane.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:

1. In a cloth measuring and computing machine having a measuring roller, the combination of a price-scale, a chart co-operating with said scale to indicate the total cost of quantities of the measured material, said chart also carrying yard-indicating numbers to indicate the number of full yards measured, a pinion actuated by the measuring roller, a clutch shaft, a gear wheel carried thereby and meshing with the pinion, a second pinion on the clutch shaft and associated with the gear wheel, a clutch for connecting the gear wheel to the last named pinion for driving the same, a horizontal shaft, a bracket plate supporting the outer end of the shaft, a gear wheel carried thereby and meshing with the last named pinion, and a number wheel carried by the said shaft adjacent to the bracket plate, and having divisions indicating inches and fractions of a yard.

2. In a cloth measuring and computing machine having a measuring roller, the combination of a price-scale, a chart co-operating with said scale to indicate the total cost of quantities of the measured material, said chart also carrying yard-indicating numbers to indicate the number of full yards measured, a horizontal shaft, a frame plate supporting the inner end of said shaft and a bracket plate supporting the outer end of said shaft, a number wheel carried rigidly by said shaft adjacent to the bracket plate, and having divisions indicating parts of a yard, a sleeve mounted loosely on said shaft, a controller wheel carried by said sleeve, means for driving said controller wheel from said measuring roller so as to give said controller wheel one complete revolution corresponding to the greatest measuring capacity of the machine, and means actuated by the controller wheel for stopping the measuring roller when the controller wheel has completed one revolution.

3. In a cloth measuring and computing machine having a measuring roller, the combination of a price-scale, a chart co-operating with said scale to indicate the total cost of quantities of the measured material, said chart also carrying yard-indicating numbers to indicate the number of full yards measured, a pinion driven by the measuring roller, a gear wheel driven by said pinion, a second pinion co-axial with the gear wheel and driven thereby, a large gear wheel driven by the last named pinion, a shaft carrying the last named gear wheel, a frame plate supporting the inner end of said shaft, a bracket plate supporting the outer end of said shaft, a cup-shaped number wheel carried by the shaft mounted with its disc lying adjacent to the bracket plate and with its rim projecting toward the frame plate, whereby a chamber is formed within the number wheel, and other mechanism of the machine supported from the frame plate and projecting into the chamber within the number wheel.

4. In a cloth measuring and computing machine having a measuring roller, the combination of a price-scale, a chart co-operating with said scale to indicate the total cost of quantities of the measured material, said chart also carrying yard-indicating numbers to indicate the number of full yards measured, a horizontal shaft, a frame plate supporting the inner end of the shaft and a bracket plate supporting the outer end of the same, a number wheel having divisions to indicate inches and fractions of a yard, carried by said shaft and lying adjacent to the bracket plate, and reduction gearing for driving said shaft from the measuring roller, located in the space between the number wheel and the frame plate.

5. In a machine of the character described, the combination of indicating mechanism, a driving member for advancing the same, means for returning the indicating mechanism to zero, a governor connected so as to be driven by the indicating mechanism when returning to zero, means for stopping the indicating mechanism at zero, and means for effecting the disconnection of the governor from the indicating mechanism when the indicating mechanism is stopped at the zero position to avoid a shock to the mechanism and to permit the governor to continue to move under its own momentum.

6. In a cloth-measuring and computing machine, the combination of a measuring roller mounted so as to be rotated by the goods being measured, stop-means for stopping the rotation of said roller at the limit of the measuring capacity of the machine, a controller wheel rotated with the measuring mechanism, a lost-motion device with said wheel and having a limited movement on said wheel, and means actuated by the lost-motion device at the limit of the measuring movement for actuating the stop-means to stop the measuring roller.

7. In a cloth-measuring and computing machine, the combination of a measuring roller mounted so as to be rotated by the goods being measured, stop-means for stopping the rotation of said roller at the limit of the measuring capacity of the machine, a controller wheel rotated with the measuring mechanism, a lost-motion device moving with said wheel and having a limited movement on said wheel, means actuated by the lost-motion device at the limit of the measuring movement for actuating the stop-means to stop the measuring roller, and means actuated by said lost-motion device for stopping the indicating mechanism at zero in its returning movement.

8. In a measuring machine of the character described, the combination of indicating mechanism, a measuring roller for actuating the same, a chart actuated by the indicating mechanism, means for returning the indicating mechanism and the chart to the zero position, said indicating mechanism including a controller wheel, a lost motion device mounted on said controller wheel and having a pin-and-slot connection with the controller wheel and means actuated by said lost-motion device for stopping the controller wheel at the zero position.

9. In a measuring machine of the character described, the combination of indicating mechanism, a measuring roller for actuating the same, a chart actuated by the indicating mechanism, means for returning the indicating mechanism and the chart to the zero position, said indicating mechanism including a controller wheel, a lost-motion device mounted on said controller wheel and having a pin-and-slot connection with the controller wheel, and means actuated by the lost-motion device for stopping the driving member at the limit of the measuring capacity of the chart.

10. In a machine of the class described, the combination of a measuring roller, a casing having a fixed guide-stop for guiding the edge of the material in passing the roller, and an adjustable guide-stop mounted on said casing to co-operate with the fixed stop, to guide the edges of the material of different widths.

11. In a cloth-measuring and computing machine, the combination of a measuring roller, a presser roller for pressing the goods to be measured against the measuring roller, means for yieldingly forcing the presser roller toward the measuring roller, and an adjusting device having a plurality of indicated adjusting positions for regulating the aforesaid means to correspond to different classes of goods to be measured.

12. In a cloth-measuring and computing machine, the combination of a measuring roller, a presser roller for pressing the goods to be measured against the measuring roller, a spring for forcing the presser roller toward the measuring roller, and an adjusting device associated with said spring and having a plurality of indicated adjusting positions for regulating the tension of said spring to correspond to different classes of goods to be measured.

13. In a cloth-measuring and computing machine, the combination of a measuring roller, a presser roller for pressing the goods to be measured against the measuring roller, a spring for forcing the presser roller toward the measuring roller, a fixed member, an adjusting plate attached to said spring and having a plurality of notches in the edges thereof to co-operate with said fixed member, whereby the position of said plate with respect to said fixed member will regulate the tension in said spring, said notches corresponding to different classes of goods to be measured.

14. In a fabric measuring machine, the combination of a measuring roller, a casing having an open end gap adjacent to the roller, and through which the fabric passes in being measured, and an adjustable guide stop mounted on said casing at said gap for guiding the edge of the fabric inserted through the open end of the gap and passing over the measuring roller.

In testimony whereof, I have hereunto set my hand.

DOUGLAS TURNER.